US 11,629,218 B2

(12) United States Patent
Tanaka et al.

(10) Patent No.: US 11,629,218 B2
(45) Date of Patent: Apr. 18, 2023

(54) COATING FILM

(71) Applicant: ASAHI KASEI KABUSHIKI KAISHA, Tokyo (JP)

(72) Inventors: Eiko Tanaka, Tokyo (JP); Koichiro Azuma, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 17/273,534

(22) PCT Filed: Oct. 31, 2019

(86) PCT No.: PCT/JP2019/042721
§ 371 (c)(1),
(2) Date: Mar. 4, 2021

(87) PCT Pub. No.: WO2020/090955
PCT Pub. Date: May 7, 2020

(65) Prior Publication Data
US 2021/0355266 A1    Nov. 18, 2021

(30) Foreign Application Priority Data

Oct. 31, 2018    (JP) .............................. JP2018-204971

(51) Int. Cl.
| | |
|---|---|
| C09D 175/04 | (2006.01) |
| C08G 18/80 | (2006.01) |
| C08G 18/81 | (2006.01) |
| C08G 18/67 | (2006.01) |
| C09D 175/14 | (2006.01) |

(52) U.S. Cl.
CPC ....... *C08G 18/815* (2013.01); *C08G 18/6755* (2013.01); *C08G 18/80* (2013.01); *C09D 175/14* (2013.01)

(58) Field of Classification Search
CPC .............................. C09D 175/04; C08G 18/80
See application file for complete search history.

(56) References Cited

U.S. PATENT DOCUMENTS

| | | | |
|---|---|---|---|
| 4,345,057 A | 8/1982 | Yamabe et al. | |
| 4,640,966 A | 2/1987 | Mitani et al. | |
| 5,239,028 A | 8/1993 | Nakagawa et al. | |
| 5,621,063 A | 4/1997 | Wolf et al. | |
| 6,583,216 B1 | 6/2003 | Koenig et al. | |
| 2011/0313101 A1 | 12/2011 | Morikami et al. | |
| 2014/0030528 A1 | 1/2014 | Kitagawa et al. | |
| 2014/0031484 A1* | 1/2014 | Kobata ................. | C08G 18/283 528/45 |
| 2015/0056376 A1 | 2/2015 | Ishikura et al. | |
| 2018/0208709 A1 | 7/2018 | Hecking et al. | |
| 2018/0282574 A1 | 10/2018 | Takeno et al. | |
| 2019/0100615 A1 | 4/2019 | Yamauchi et al. | |

FOREIGN PATENT DOCUMENTS

| | | |
|---|---|---|
| CN | 105418886 | 3/2016 |
| JP | 57-034107 | 2/1982 |
| JP | 61-275311 | 12/1986 |
| JP | 01-261409 | 10/1989 |
| JP | 03-006273 | 1/1991 |
| JP | 04-216815 | 8/1992 |
| JP | 08-225630 | 9/1996 |
| JP | 08-319332 | 12/1996 |
| JP | 2005-126649 | 5/2005 |
| JP | 2011-162633 | 8/2011 |
| JP | 2014-070151 | 4/2014 |
| JP | 2015-007239 | 1/2015 |
| JP | 2017-052917 | 3/2017 |
| JP | 2018-062633 | 4/2018 |
| WO | 2012/137884 | 10/2012 |
| WO | 2013/151143 | 10/2013 |
| WO | 2017/169559 | 10/2017 |

OTHER PUBLICATIONS

European Search report issued with respect to European application No. 19879713.6, dated Nov. 2, 2021.
ISR issued in WIPO Patent Application No. PCT/JP2019/042721, dated Jan. 7, 2020, English translation.
Written Opinion of ISA issued in WIPO Patent Application No. PCT/JP2019/042721, dated Jan. 7, 2020, English translation.

* cited by examiner

*Primary Examiner* — Michael L Leonard
(74) *Attorney, Agent, or Firm* — Greenblum & Bernstein, P.L.C.

(57) ABSTRACT

The present invention provides a coating film having a structure represented by the following general formula (1) (in the formula, $R^{11}$ is a residue formed by removing one isocyanate group from a polyisocyanate, and $R^{12}$ is an alkyl group or an alkoxy group having 2 to 12 carbon atoms, $R^{13}$ is a residue formed by removing one hydroxyl group from a polyol), wherein a König hardness of the coating film is 20 or more, in an SS curve measurement of a tensile test, the coating film has an elastic deformation region and a plastic deformation region, and in the SS curve measurement, a stress at an inflection point stress between the elastic deformation region and the plastic deformation region is 5 MPa or more.

(1)

$$R^{11}-\overset{H}{\underset{}{N}}-\overset{O}{\underset{}{C}}\diagdown\overset{O}{\underset{\underset{O}{\parallel}}{\underset{}{\diagup}}}\overset{O-R^{13}}{\underset{R^{12}}{}}$$

9 Claims, No Drawings

COATING FILM

TECHNICAL FIELD

The present invention relates to a coating film.

BACKGROUND ART

Conventionally, polyurethane resin coating materials have excellent abrasion resistance, chemical resistance, and stain resistance. Moreover, polyurethane resin coating materials using polyisocyanates derived from aliphatic or alicyclic diisocyanates also have excellent weather resistance, and thus the demand for them has increased.

Since polyurethane resin coating materials are usually of a two-liquid type, their use is inconvenient. That is, conventional polyurethane resin coating materials are composed of two components: a polyol and a polyisocyanate, which need to be stored separately and mixed at the time of coating. In addition, once mixed, the coating materials gel in a short time and cannot be used. This makes it extremely difficult to perform an automated coating system in the field of an automobile or a domestic electric appliance, in which a coating operation is conducted in an assembly-line operation. Moreover, since isocyanates easily react with water, they cannot be used in aqueous coating materials such as electrodeposition coating materials. Further, since it is necessary to sufficiently clean the coating machine and the coating tank at the end of the work, work efficiency is significantly reduced.

Conventionally, in order to overcome the above-mentioned disadvantages, it has been proposed to use a blocked polyisocyanate in which all active isocyanate groups are blocked with a blocking agent. This blocked polyisocyanate does not react with the polyol at room temperature, but the blocking agent is dissociated by heating to regenerate active isocyanate groups and react with the polyol to cause a cross-linking reaction, thereby making it possible to overcome the above-mentioned disadvantages. A number of blocking agents have been developed, and for example, phenol, methyl ethyl ketoxime and the like are representative block agents.

Further, conventionally, for the purpose of improving the appearance (smoothness) of the coating film, a method of blending a blocked polyisocyanate obtained by using an active methylene compound such as an acetoacetic ester or a malonic acid diester as a blocking agent into a coating composition is known (see, for example, Patent Documents 1 and 2).

PRIOR ART DOCUMENT

Patent Document

[Patent Document 1] Japanese Unexamined Patent Application, First Publication No. 2014-070151
[Patent Document 2] PCT International Publication No. WO 2013/151143
[Patent Document 3] Japanese Unexamined Patent Application, First Publication No. S57-034107
[Patent Document 4] Japanese Unexamined Patent Application, First Publication No. S61-275311
[Patent Document 5] Japanese Unexamined Patent Application, First Publication No. H1-261409
[Patent Document 6] Japanese Unexamined Patent Application, First Publication No. H3-006273

DISCLOSURE OF INVENTION

Problems to be Solved by the Invention

However, in the case of a dissociated blocked polyisocyanate, a dissociated low molecular weight-blocking agent component remains in the coating film that deteriorates the physical properties of the coating film, and depending on the volatilization behavior, the appearance of the coating film may also deteriorate.

On the other hand, in the case of the active methylene-based blocked polyisocyanate described in Patent Documents 1 and 2, there is room for improvement in terms of hardness, solvent resistance, and scratch resistance of the obtained coating film.

The present invention has been made in view of the above circumstances, and provides a coating film formed by curing a one-liquid type coating composition, the coating film having excellent solvent resistance while maintaining good appearance, and having good dimensional stability for a plastic film when laminated with the coating film.

Means for Solving the Problems

That is, the present invention includes the following aspects.
[1] A coating film having a structure represented by the following general formula (1),
wherein
a König hardness of the coating film is 20 or more,
in an SS curve measurement of a tensile test, the coating film has an elastic deformation region and a plastic deformation region, and
in the SS curve measurement, a stress at an inflection point stress between the elastic deformation region and the plastic deformation region is 5 MPa or more.

[Chemical formula 1]

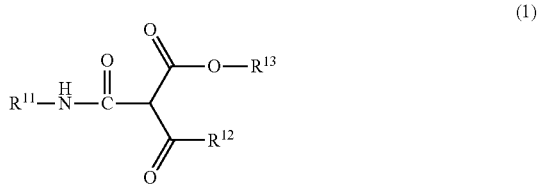

(1)

(In the general formula (1), $R^{11}$ is a residue formed by removing one isocyanate group from any one of isocyanurate-type polyisocyanates, biuret-type polyisocyanates, urethane-modified isocyanurate-type polyisocyanates, and allophanate-type polyisocyanates, $R^{12}$ is an alkyl group or an alkoxy group having 2 to 12 carbon atoms, an aryloxy group having 6 to 12 carbon atoms, or a group represented by the following general formula (2), $R^{13}$ is a residue formed by removing one hydroxyl group of a polyol).

[Chemical formula 2]

*—O—$(Y^{21}$—O$)_{n21}$—$R^{21}$ (2)

(In the general formula (2), n21 is an integer of 2 to 12, $Y^{21}$ is an ethylene group or a propylene group, $R^{21}$ is an alkyl group having 1 to 9 carbon atoms, and the asterisk represents a bonding point).

[2] The coating film according to [1], wherein the stress at an inflection point is 20 MPa or more.

[3] The coating film according to [1] or [2], wherein
the coating film is formed by curing a coating composition containing a blocked polyisocyanate component and a polyol,
in the coating composition, a molar ratio of the isocyanate group of the blocked polyisocyanate component to a hydroxyl group of the polyol is 0.4 or more and 2.0 or less, and the blocked polyisocyanate component contains a blocked polyisocyanate obtained from a polyisocyanate and a compound represented by the following general formula (3).

[Chemical formula 3]

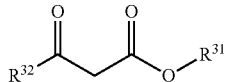

(3)

(In the general formula (3), $R^{31}$ is an alkyl group, $R^{32}$ is a hydroxyl group; an alkyl group which may contain one or more substituents selected from the group consisting of a hydroxyl group and an amino group; an amino group which may contain one or more substituents selected from the group consisting of a hydroxyl group and an alkyl group; an aryl group which may contain one or more substituents selected from the group consisting of a hydroxyl group and an amino group; an alkoxy group which may contain one or more substituents selected from the group consisting of a hydroxyl group and an amino group; or an aryloxy group which may contain one or more substituents selected from the group consisting of a hydroxyl group and an amino group, provided that the amino group may form a ring by linking the two substituents to each other).
[4] The coating film according to [3], wherein the molar ratio of the isocyanate group of the polyisocyanate component to the hydroxyl group of the polyol is 0.4 or more 1.0 or less.
[5] The coating film according to [3] or [4], wherein $R^{31}$ is a secondary alkyl group or a tertiary alkyl group.
[6] The coating film according to [3] or [4], wherein $R^{31}$ is a tertiary alkyl group.
[7] The coating film according to any one of [3] to [6], wherein $R^{32}$ is a secondary alkoxy group or a tertiary alkoxy group.
[8] The coating film according to any one of [3] to [6], wherein $R^{32}$ is a tertiary alkoxy group.
[9] A method for producing a coating film, comprising.
a step of applying a coating composition containing a blocked polyisocyanate component and a polyol and drying at 100 to 200° C. for 10 to 60 minutes or at 70 to 90° C. for 1 to 14 days, wherein
in the coating composition, a molar ratio of the isocyanate group of the blocked polyisocyanate component to a hydroxyl group of the polyol is 0.4 or more and 2.0 or less, and
the blocked polyisocyanate component contains a blocked polyisocyanate obtained from a polyisocyanate and a compound represented by the following general formula (3).

[Chemical formula 4]

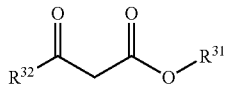

(3)

(In the general formula (3), $R^{31}$ is an alkyl group, $R^{31}$ is a hydroxyl group; an alkyl group which may contain one or more substituents selected from the group consisting of a hydroxyl group and an amino group; an amino group which may contain one or more substituents selected from the group consisting of a hydroxyl group and an alkyl group; an aryl group which may contain one or more substituents selected from the group consisting of a hydroxyl group and an amino group; an alkoxy group which may contain one or more substituents selected from the group consisting of a hydroxyl group and an amino group; or an aryloxy group which may contain one or more substituents selected from the group consisting of a hydroxyl group and an amino group, provided that the amino group may form a ring by linking the two substituents to each other).
[10] The method for producing a coating film according to [9], wherein the molar ratio of the isocyanate group of the blocked polyisocyanate component to the hydroxyl group of the polyol is 0.4 or more 1.0 or less.

Effects of the Invention

According to the above-described aspects, a coating film formed by curing a one-liquid type coating composition can be provided. The coating film has excellent solvent resistance while maintaining good appearance, and has good dimensional stability of plastic film when laminated with the coating film.

BEST MODE FOR CARRYING OUT THE INVENTION

Hereinafter, embodiments for carrying out the present invention (hereinafter, referred to as "present embodiment") will be described in detail. The present invention is not limited to the following embodiments. The present invention can be appropriately modified and implemented within the scope of the invention.

In addition, in this description, the term "polyol" means a compound having two or more hydroxyl groups (—OH).

In this description, the term "polyisocyanate" means a product of a reaction in which a plurality of monomer compounds having one or more isocyanate groups (—NCO) are bonded.
<<Coating Film>>
The coating film of the present embodiment has a structure represented by the following general formula (1) (hereinafter, may be abbreviated as "structure (1)") in the coating film.

[Chemical Formula 5]

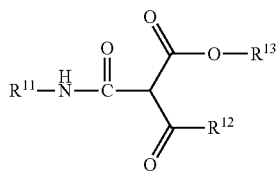

(1)

(In the general formula (1), $R^{11}$ is a residue formed by removing one isocyanate group from any one of isocyanurate-type polyisocyanates, biuret-type polyisocyanates, urethane-modified isocyanurate-type polyisocyanates, and allophanate-type polyisocyanates, $R^{12}$ is an alkyl group or an alkoxy group having 1 to 12 carbon atoms, an aryloxy group having 6 to 12 carbon atoms, or a group represented by the following general formula (2) (hereinafter, may be abbreviated as "group (2)"), $R^{13}$ is a residue formed by removing one hydroxyl group of a polyol.)
[Chemical Formula 6]

(2)

(In the general formula (2), n21 is an integer of 2 to 12. $Y^{21}$ is an ethylene group or a propylene group. $R^{21}$ is an alkyl group having 1 to 9 carbon atoms. Further, the asterisk indicates a bonding site.)

The König hardness of the coating film of the present embodiment is 20 or more, preferably 21 or more, more preferably 22 or more, even more preferably 30 or more, and particularly preferably 40 or more.

When the König hardness is at least the above lower limit, it is possible that the coating film has further sufficient hardness.

On the other hand, the upper limit of the König hardness of the present embodiment is not particularly limited, for example, it may be 150.

The König hardness of the coating film of the embodiment can be measured using the method described in the Examples described later.

In an SS curve measurement of a tensile test of the coating film according to the present embodiment, the coating film has an elastic deformation region and a plastic deformation region. The term "SS curve measurement" here is also referred to a stress-strain curve, and is a curve drawn by performing a tensile test using a test piece of a coating film and plotting the obtained strain on the x-axis and the obtained stress on the y-axis. Specifically, the SS curve can be measured by using the method described in the Examples described later.

When the stress and strain are small, the stress and strain have a proportional relationship, and the range in which this relationship is maintained is referred to as an elastic deformation region. In addition, the first part where the strain increases without increasing the stress, that is, the top formed at the beginning of the SS curve is referred to as a yield point. When a stress exceeding this yield point is generated, the test piece is plastically deformed and does not return to its original shape. Therefore, the region beyond the yield point is referred to as a plastic deformation region. The inflection point between the elastic deformation region and the plastic deformation region is referred to as an elastic limit. The stress is preferably 5 MPa or more at the inflection point, more preferably 10 MPa or more, and particularly preferably 20 MPa or more. When the stress at the inflection point is at least the above lower limit, abnormalities are less likely to occur in the coating film even when the base material is deformed.

Further, although the upper limit of the stress at the inflection point is not particularly limited, it is preferably 100 MPa or less, more preferably 90 MPa or less, and particularly preferably 80 MPa or less. When the stress at the inflection point is not more than the above upper limit, crack resistance of the coating film is improved even when the base material is significantly deformed.

Since the coating film of the present embodiment has the above-described configuration, the coating film has excellent solvent resistance while maintaining good appearance, and has good dimensional stability of plastic film when laminated with the coating film, without dissociation of the blocking agent and remaining of the blocking agent component.

<Structure (1)>

The structure (1) is a structure in which a compound represented by the general formula (3) described later (hereinafter, may be abbreviated as "blocking agent (3)") as a blocking agent is bonded to the isocyanate group of the polyisocyanate. Further, a polyol, which is a main component contained in the coating composition, is further bonded to the blocking agent (3). That is, the structure (1) is a structure in which a polyisocyanate and a polyol are bonded via the blocking agent (3). The blocking agent (3) contained in the coating film of the present embodiment remains in the coating film as a cross-linking component between the polyol as a main agent and the polyisocyanate as a curing agent without dissociation, thereby making it possible to obtain a coating film having improved adhesion to a plastic substrate while maintaining good appearance.

[$R^{11}$]
$R^{11}$ is a residue formed by removing one isocyanate group from any one of isocyanurate-type polyisocyanates, biuret-type polyisocyanates, urethane-modified isocyanurate-type polyisocyanates, and allophanate-type polyisocyanates. Examples of the polyisocyanate will be described later as the constituent components of the coating composition.

[$R^{12}$]
$R^{12}$ is an alkyl group or an alkoxy group having 1 to 12 carbon atoms, an aryloxy group having 6 to 12 carbon atoms, or a group (2).

The alkyl group may be a chain-like or a cyclic alkyl group. When the alkyl group is a chain-like alkyl group, it may be a linear or a branched alkyl group.

Examples of the linear alkyl group having 1 to 12 carbon atoms include a methyl group, ethyl group, n-propyl group, n-butyl group, n-pentyl group, n-hexyl group, n-heptyl group, n-octyl group, n-nonyl group and the like. Examples of the branched alkyl group having 2 to 12 carbon atoms include 1-methylethyl group (isopropyl group), 1-methylpropyl group (sec-butyl group), 2-methylpropyl group (isobutyl group), 1,1-dimethylethyl group (tert-butyl group), 1-methylbutyl group, 2-methylbutyl group, 3-methylbutyl group, 1,1-dimethylpropyl group and the like. Examples of the cyclic alkyl group having 3 to 12 carbon atoms include a cyclopropyl group, cyclobutyl group, cyclopentyl group, cyclohexyl group, cycloheptyl group, cyclooctyl group and the like.

The alkoxy group is a group having a structure (—OR) in which an alkyl group is bonded to an oxygen atom. The alkyl group constituting the alkoxy group may be a chain-like or a cyclic alkyl group. When the alkyl group is a chain-like group, it may be a linear or a branched alkyl group.

Examples of the alkoxy group having 2 to 12 carbon atoms include an ethoxy group, n-propoxy group, iso-propoxy group, cyclopropoxy group, n-butoxy group, sec-butoxy group, iso-butoxy group, tert-butoxy group, cyclobutoxy group and the like.

The aryloxy group is a group having a structure (—OAr) in which an aryl group is bonded to an oxygen atom. Examples of the aryloxy group having 6 to 12 carbon atoms include a phenoxy group and the like.

(Group (2))

The group (2) is a residue formed by removing a proton from the hydroxyl group of a polyoxyethylene alkyl ether or a polyoxypropylene alkyl ether which is a nonionic hydrophilic compound, and is a group represented by the following general formula (2).

When the structure (1) includes the group (2), the structure has excellent hydrophilicity, and the coating composition used for forming the coating film of the present embodiment can be preferably used as an aqueous coating composition.

[Chemical Formula 7]

$$*-O-(Y^{21}-O)_{n21}-R^{21} \quad (2)$$

(In the general formula (2), n21 is an integer of 2 to 12. $Y^{21}$ is an ethylene group or a propylene group. $R^{21}$ is an alkyl group having 1 to 9 carbon atoms. The asterisk indicates a bonding site.)

n21 represents the repeating number of the ethyleneoxy group or the propyleneoxy group, and is an integer of 2 to 12.

[$R^{13}$]

$R^{13}$ is a residue formed by removing one hydroxyl group from a polyol. Examples of the polyol will be described later as the constituent components of the coating composition.

<Coating Composition>

The coating film of the present embodiment is formed by curing a one-liquid type coating composition. The one-liquid type coating composition contains a blocked polyisocyanate component and a polyol.

In the coating composition, the molar ratio of the blocked isocyanate group of the blocked polyisocyanate to the hydroxyl group of the polyol (hereinafter, may be abbreviated as "effective ratio NCO/OH") is preferably 0.4 or more and 2.0 or less, more preferably 0.4 or more and 1.0 or less, even more preferably 0.5 or more and 1.0 more less. When the effective NCO/OH ratio is at least the above lower limit, solvent resistance of the coating film can be improved. On the other hand, when the effective NCO/OH ratio is not more than the above upper limit, pot life of the one-liquid type coating composition can be improved, and hardness and solvent resistance of the coating film can be improved.

Generally, the term "pot life" means a time period during which, after a composition is prepared by mixing a main agent and a curing agent in a composition such as a paint and adhesive, performance as a coating composition is secured. It is also called "usable time".

[Blocked Polyisocyanate Component]

The blocked polyisocyanate component contains a blocked polyisocyanate obtained from a polyisocyanate and one or more blocking agents. That is, the blocked polyisocyanate is a reaction product of the polyisocyanate with one or more kinds of blocking agents, and is a compound in which the isocyanate group of the polyisocyanate is blocked by one or more kinds of blocking agents.

(Polyisocyanate)

The polyisocyanate used for producing the blocked polyisocyanate is a reaction product obtained by reacting a plurality of monomer compounds having one or more isocyanate groups (—NCO) (hereinafter, may be referred to as "isocyanate monomer").

The isocyanate monomer preferably has 4 to 30 carbon atoms. Specific examples of the isocyanate monomer include the following. These isocyanate monomers may be used alone or in combination of two or more.

(1) Aromatic diisocyanates such as a diphenylmethane-4,4'-diisocyanate (hereinafter may be referred to as "MDI"), 1,5-naphthalenediocyanate, tolylene diisocyanate (hereinafter may be referred to as "TDI"), xylylene diisocyanate, m-tetrarnethylxylylene diisocyanate (hereinafter, may be referred to as "TMXDI") or the like.

(2) Aliphatic diisocyanates such as a 1,4-tetramethylene diisocyanate, 1,5-pentamethylene diisocyanate, 1,6-hexamethylene diisocyanate (hereinafter, may be referred to as "HDI"), 2,2,4-trimethyl-1,6-diisocyanatohexane, 2,4,4-trimethyl-1,6-hexamethylene diisocyanate, 2-methylpentane-1,5-diisocyanate (hereinafter may be referred to as "MPDI"), lysine diisocyanate (hereinafter, may be referred to as "LDI") or the like.

(3) Alicyclic diisocyanates such as isophorone diisocyanate (hereinafter, may be referred to as "IPDI"), 1,3-bis (diisocyanate methyl) cyclohexane, 4,4'-dicyclohexylmethane diisocyanate, diisocyanate norbornane, di(isocyanate methyl) norbornane or the like.

(4) Triisocyanates such as a 4-isocyanate methyl-1,8-octamethylene diisocyanate (hereinafter may be referred to as "NTI"), 1,3,6-hexamethylene triisocyanate (hereinafter, may be referred to as "HTI"), bis(2-isocyanatoethyl)2-isocyanatoglutarate (hereinafter, may be referred to as "GTI"), lysine triisocyanate (hereinafter, may be referred to as "LTI") or the like.

Among the examples, from the viewpoint of having excellent weather resistance, the isocyanate monomer is preferably one or more kinds of diisocyanates selected from the group consisting of an aliphatic diisocyanate and an alicyclic diisocyanate. Further, the isocyanate monomer is more preferably HDI or IPDI from the viewpoint of easy industrial availability. Further, the isocyanate monomer is even more preferably HDI from the view point of reducing the viscosity of the blocked polyisocyanate component.

The polyisocyanate may have a functional group such as an isocyanurate group, biuret group, urethane group, allophanate group or the like. Examples of the polyisocyanate having these functional groups include an isocyanurate-type polyisocyanate, biuret-type polyisocyanate, urethane-modified isocyanurate-type polyisocyanate, allophanate-type polyisocyanate and the like. These polyisocyanates may be used alone or in combination of two or more. Among the examples, the polyisocyanate is preferably an isocyanurate-type polyisocyanate or a urethane-modified isocyanurate-type polyisocyanurate from the viewpoint of having excellent weather resistance and heat resistance.

These polyisocyanates can be obtained by carrying out known reactions, for example, an isocyanurate-formation reaction for forming an isocyanurate group, a biuret-formation reaction for forming a biuret group, a urethane-formation reaction for forming a urethane group, an allophanation-formation reaction for forming an allophanate group and the like at once in the presence of an excess of isocyanate monomers and removing the unreacted isocyanate monomers after completion of the reaction. That is, the polyisocyanates obtained by the above reaction are polyisocyanates in which a plurality of the above-mentioned isocyanate monomers are bonded and a reaction product having one or more groups selected from the group consisting of an isocyanurate group, a urethane group, a biuret group and an allophanate group.

Further, the above reactions may also be carried out separately, and the obtained polyisocyanates may be mixed in a specific ratio.

From the viewpoint of simplicity of production, it is preferable to carry out the above reaction at once to obtain the polyisocyanates, and from the viewpoint of easily adjusting the molar ratio of each functional group, it is preferable to produce the polyisocyanates separately and then mix them.

When the desired conversion rate (mass ratio of polyisocyanates produced by various reactions to charged isocyanate monomers) is reached, the various reactions are stopped by adding a reaction terminator. Examples of the reaction terminator include acidic compounds such as a phosphoric acid, acidic phosphoric acid ester or the like in the case of isocyanurate-formation reaction.

The unreacted isocyanate monomer can be removed from the reaction solution after completion of the reaction by thin film distillation, extraction or the like to obtain a desired polyisocyanate.

(Blocking Agent)

The blocking agent used in the production of the blocked polyisocyanate contains a blocking agent (3). The blocking agent (3) is an active methylene-based blocking agent, and is a compound represented by the following general formula (3).

[Chemical Formula 8]

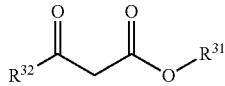

(3)

In the general formula (3), $R^{31}$ is an alkyl group. The number of carbon atoms of the alkyl group is preferably 2 or more and 12 or less. Specific examples of the alkyl group include those exemplified as the examples of $R^{12}$. Among the examples, $R^{31}$ is preferably a secondary alkyl group or a tertiary alkyl group, and more preferably a tertiary alkyl.

In the general formula (3), $R^{32}$ is a hydroxyl group; an alkyl group optionally having one or more substituents selected from the group consisting of a hydroxyl group and an amino group; an amino group optionally having one or more substituents selected from the group consisting of a hydroxyl group and an alkyl group; an aryl group optionally having one or more substituents selected from the group consisting of a hydroxyl group and an amino group; an alkoxy group optionally having one or more substituents selected from the group consisting of a hydroxyl group and an amino group; or an aryloxy group optionally having one or more substituents selected from the group consisting of a hydroxyl group and an amino group. The amino group may form a ring by bonding the above-descried two substituents to each other.

When $R^{32}$ is an alkyl group having no substituent, the alkyl group preferably has 1 or more and 12 or less carbon atoms. Specific examples of the alkyl group include those exemplified as the examples of $R^{12}$.

When $R^{32}$ is an alkyl group having a substituent, the substituent is a hydroxyl group or an amino group.

Examples of the alkyl group having a hydroxyl group as a substituent include a hydroxymethyl group, hydroxyethyl group, hydroxypropyl group and the like.

Examples of the alkyl group having an amino group as a substituent include an aminomethyl group, aminoethyl group, aminopropyl group, aminobutyl group and the like.

Examples of the alkyl group having a hydroxyl group and an amino group as a substituent include a hydroxyaminomethyl group, hydroxyaminoethyl group, hydroxyaminopropyl group and the like.

When $R^{32}$ is an amino group having a substituent, the substituent is a hydroxyl group or an alkyl group.

Examples of the amino group having a hydroxyl group as a substituent include a hydroxyamino group (—NH—OH).

Examples of the amino group having an alkyl group as a substituent include a methylamino group, ethylamino group, n-butylamino group, dimethylamino group, diethylamino group, dipropylamino group, diisopropylamino group, di-tert-butylamino group, di-sec-butylamino group, diisobutylamino group, 2,6-dimethylpiperidyl group and the like.

Examples of the amino group having a hydroxyl group and an alkyl group as a substituent include a hydroxymethylene amino group, hydroxyethylene amino group, hydroxypropylene amino group, hydroxybutylene amino group and the like.

Examples of the amino group in which the two substituents are bonded to each other to form a ring include an ethyleneimino group, azacyclobutyl group, pyrrolidyl group, piperidyl group, 2,6-dimethylpiperidyl group, hexamethyleneimino group and the like.

When $R^{32}$ is an aryl group having no substituent, the aryl group preferably has 6 or more and 12 or less carbon atoms. Specific examples of the aryl group include a monocyclic aromatic hydrocarbon group, bicyclic aromatic hydrocarbon group and the like.

Examples of the monocyclic aromatic hydrocarbon group include a phenyl group and the like.

Examples of the bicyclic aromatic hydrocarbon group include an indanyl group, indenyl group, pentarenyl group, azulenyl group, naphthyl group, tetrahydronaphthyl group and the like.

When $R^{32}$ is an aryl group having a substituent, the substituent is a hydroxyl group or an amino group.

Examples of the aryl group having a hydroxyl group as a substituent include a phenol group and the like.

Examples of the aryl group having an amino group as a substituent include an aniline group and the like.

Examples of the aryl group having a hydroxyl group and an amino group as a substituent include an aminophenol group (hydroxyaniline group) and the like.

When $R^{32}$ is an alkoxy group having no substituent, the alkoxy group preferably has 2 or more and 12 or less carbon atoms. Specific examples of the alkoxy group include those exemplified as the examples of $R^{12}$.

When $R^{32}$ is an alkoxy group having a substituent, the substituent is a hydroxyl group or an amino group.

Examples of the alkoxy group having a hydroxyl group as a substituent include a hydroxymethyleneoxy group, hydroxyethyleneoxy group, hydroxypropyleneoxy group, hydroxybutyleneoxy group and the like.

Examples of the alkoxy group having an amino group as a substituent include an aminomethyleneoxy group, aminoethyleneoxy group, aminopropyleneoxy group, aminobutyleneoxy group and the like.

Examples of the alkoxy group having a hydroxyl group and an amino group as a substituent include a hydroxyaminomethylidineoxy group, hydroxyaminoethylidineoxy group, hydroxyaminoproppyridineoxy group and the like.

When $R^{32}$ is an aryloxy group having no substituent, the aryloxy group preferably has 6 or more and 12 or less carbon atoms. Specific examples of the aryloxy group include those exemplified as the examples of $R^{12}$.

When $R^{32}$ is an aryloxy group having a substituent, the substituent is a hydroxyl group or an amino group.

Examples of the aryloxy group having a hydroxyl group as a substituent include a hydroxy phenoxy group and the like.

Examples of the alkoxy group having an amino group as a substituent include an amino hydroxyphenoxy group and the like.

Examples of the alkoxy group having a hydroxyl group and amino group as a substituent include an amino hydroxy phenoxy group and the like.

Among the examples, $R^{32}$ is preferably an alkyl group or an alkoxy group, more preferably an alkoxy group from the viewpoint of being easily available industrially. The alkoxy group for $R^{32}$ is preferably a secondary alkoxy group or a tertiary alkoxy group, and more preferably a tertiary alkoxy group.

The blocking agent (3) is preferably one in which $R^{31}$ is a secondary alkyl group or a tertiary alkyl group, and $R^{32}$ is an alkoxy group from the viewpoint of having excellent coating film hardness.

The blocking agents (3) is more preferably one in which $R^{31}$ is a tertiary alkyl and $R^{32}$ is a tertiary alkoxy group from the viewpoint of having excellent coating film hardness, solvent resistance and scratch resistance.

When $R^{31}$ is a tertiary alkyl and $R^{32}$ is a tertiary alkoxy group, examples of the tertiary alkyl group constituting the tertiary alkoxy group for $R^{32}$ include those exemplified as the examples of the tertiary alkyl group for $R^{31}$.

Specific examples of the blocking agent (3) include an ethyl acetoacetate, diethyl malonate, tert-butyl acetoacetate, di-tert-butyl malonate, iso-propyl acetoacetate, di-iso-propyl malonate and the like.

Among the examples, the blocking agent (3) is preferably a di-tert-butyl malonate or a di-iso-propyl malonate.

As the blocking agent used for producing the blocked polyisocyanate, other blocking agents may be used in combination with the blocking agent (3).

Examples of said other blocking agents include (I) alcohol-based compounds, (2) alkylphenol-based compounds, (3) phenol-based compounds, (4) active methylene-based compounds, (5) mercaptan-based compounds, and (6) acid amide-based compounds, (7) acid imide-based compounds, (8) imidazole-based compounds, (9) urea-based compounds, (10) oxime-based compounds, (11) amine-based compounds, (12) imide-based compounds, (13) bisulfites, (14) pyrazole-based compounds, and (15) triazole-based compounds, and the like. More specific examples of the blocking agent include those shown below.

(1) Alcohol-based compounds: alcohols such as methanol, ethanol, 2-propanol, n-butanol, sec-butanol, 2-ethyl-1-hexanol, 2-methoxyethanol, 2-ethoxyethanol, 2-butoxyethanol and the like.

(2) Alkylphenol-based compounds: mono and dialkylphenols having an alkyl group having 4 or more carbon atoms as a substituent. Specific examples of the alkylphenol-based compounds include monoalkylphenols such as an n-propylphenol, iso-propylphenol, n-butylphenol, sec-butylphenol, tert-butylphenol, n-hexylphenol, 2-ethylhexylphenol, n-octylphenol, and n-nonylphenol.or the like; dialkylphenols such as a di-n-propylphenol, diisopropylphenol, isopropylcresol, di-n-butylphenol, di-tert-butylphenol, di-sec-butylphenol, di-n-octylphenol, di-2-ethylhexylphenol, di-n-nonylphenol or the like.

(3) Phenol-based compounds: phenol, cresol, ethylphenol, styrenated phenol, hydroxybenzoic acid ester and the like.

(4) Active methylene-based compounds other than the blocking agent (3): dimethyl malonate, acetylacetone and the like.

(5) Mercaptan-based compounds: butyl mercaptan, dodecyl mercaptan and the like.

(6) Acid amide-based compounds: acetanilide, acetate amide, ε-caprolactam, δ-valerolactam, γ-butyrolactam and the like.

(7) Acid imide-based compounds: imide succinate, imide maleate and the like.

(8) Imidazole-based compounds: imidazole, 2-methylimidazole and the like.

(9) Urea-based compounds: urea, thiourea, ethylene urea and the like.

(10) Oxime-based compounds: formaldehyde, acetaldehyde, acetoxime, methylethylketooxime, cyclohexanone oxime and the like.

(11) Amine-based compounds: diphenylamine, aniline, carbazole, di-n-propylamine, diisopropylamine, isopropylethylamine and the like.

(12) Imine-based compounds: ethyleneimine, polyethyleneimine and the like.

(13) Bisulfite compound: sodium bisulfite and the like.

(14) Pyrazole-based compounds: pyrazole, 3-methylpyrazole, 3,5-dimethylpyrazole and the like.

(15) Triazole compounds: 3,5-dimethyl-1,2,4-triazole and the like.

The blocking reaction of polyisocyanate using these other blocking agents and the blocking agent (3) may be carried out at the same time, or carried out by using one blocking agent and then using the other blocking agent for the remaining free isocyanate groups.

(Hydrophilic Compound)

The blocked polyisocyanate may have a structural unit derived from a hydrophilic compound. The hydrophilic compound can react with one or more isocyanate groups with respect to one molecule of the hydrophilic compound. The hydrophilic compound preferably has one or more active hydrogen-containing groups for reacting with the isocyanate group of the polyisocyanate in order to react with one isocyanate group with respect to one molecule of the hydrophilic compound. Specific examples of the active hydrogen-containing group include a hydroxyl group, mercapto group, carboxylic acid group, amino group, and a thiol group.

Examples of the hydrophilic group include a nonionic hydrophilic group, cationic hydrophilic group and an anionic hydrophilic group. These hydrophilic groups may be used alone, or in combination of two or more.

Among the examples, the hydrophilic group is preferably a nonionic hydrophilic group from the viewpoint of easy availability and resistance to electrical interaction with the formulation.

Specific examples of the hydrophilic compound having a nonionic hydrophilic group include monoalcohols and compounds in which ethylene oxide or propylene oxide is added to the hydroxyl groups of alcohols. Examples of the monoalcohol include a methanol, ethanol, butanol and the like. Examples of the compound obtained by adding ethylene oxide or propylene oxide to the hydroxyl group of the alcohol include an ethylene glycol, diethylene glycol, propylene glycol, a compound represented by the following general formula (4) (hereinafter, may be referred to as "hydrophilic compound (4)") and the like. These hydrophilic compounds having a nonionic hydrophilic group also have an active hydrogen-containing group that reacts with the isocyanate group. Among the examples, by using the hydrophilic compound (4) as a hydrophilic compound, a coating film having the structure (1) in which $R^{12}$ is the above-described group (2) can be obtained.

[Chemical Formula 9]

$$HO-(Y^{41}-O)_{n41}-R^{41} \quad (4)$$

(In the general formula (4), $n^{41}$ is an integer of 2 or more and 12 or less. $Y^{41}$ is an ethylene group or a propylene group. $R^{41}$ is an alkyl group having 1 or more carbon atoms and 9 or less carbon atoms.)

The hydrophilic compound (4) is a polyoxyethylene alkyl ether or a polyoxypropylene alkyl ether, and n41, $Y^{41}$ and $R^{41}$ correspond to n21, $Y^{21}$ and $R^{21}$ in the above-described general formula (2), respectively.

The addition number of ethylene oxide of the compound to which ethylene oxide or propylene oxide is added is preferably 2 or more and 12 or less. When the number of ethylene oxide or propylene oxide added is equal to or greater than the above lower limit, water dispersibility tends to be more effectively imparted to the blocked polyisocyanate component, and when the number of ethylene oxide or propylene oxide added is equal to or less than the above upper limit, precipitates of the blocked polyisocyanate components tend to be less likely to occur during low temperature storage.

(Other Additives)

The blocked polyisocyanate component is not particularly limited, but may further contain other additives such as a compound having an active hydrogen-containing group, a solvent or the like in addition to the above-described blocked polyisocyanate.

The active hydrogen group contained in the active hydrogen group-containing compound is preferably a hydroxyl group or an amino group.

That is, the active hydrogen group-containing compound is preferably, for example, monoalcohols, dialcohols or anines. These monoalcohols, dialcohols and amines may be linear or branched.

Examples of the monoalcohols include (1) aliphatic alcohols, (2) mono (or oligo) ethylene glycol monoalkyl ethers, (3) mono (or oligo) propylene glycol monoalkyl ethers, (4) mono (or oligo) ethylene glycol monoesters, (5) mono (or oligo) propylene glycol monoesters, and the like. These monoalcohols may be contained alone, or in combination of two or more.

(1) Aliphatic alcohols such as a methanol, ethanol, n-propanol, 2-propanol, n-butanol, isobutanol, tert-butanol, 2-butanol, 2-ethyl-1-butanol, isoamyl alcohol, n-pentanol, isopentanol, 2-methyl-1-pentanol, 2-methyl-1-pentanol, hexanol, 2-ethylhexanol, n-heptanol, 2-heptanol, heptanol, octanol, nonanol, decanol, undecanol, dodecanol, tridecanol, tetradecanol, pentadecanol, hexadecanol, heptadecanol, octadecanol, 2-methoxyethanol, 2-ethoxyethanol, 2-butoxyethanol and isomer alcohols thereof, or the like.

(2) Mono (or oligo) ethylene glycol monoalkyl ethers such as ethylene glycol monoalkyl ethers, diethylene glycol monoalkyl ethers, triethylene glycol monoallyl ethers, tetraethylene glycol monoalkyl ethers, or the like.

(3) Mono (or oligo) propylene glycol monoalkyl ethers such as propylene glycol monoalkyl ethers, dipropylene glycol monoalkyl ethers, tripropylene glycol monoalkyl ethers, tetrapropylene glycol monoalkyl ethers, or the like.

(4) Mono (or oligo) ethylene glycol monoesters such as ethylene glycol monoesters, diethylene glycol monoesters, triethylene glycol monoesters, tetraethylene glycol monoesters, or the like.

(5) Mono (or oligo) propylene glycol monoesters such as propylene glycol monoesters, dipropylene glycol monoesters, tripropylene glycol monoesters, tetrapropylene glycol monoesters, or the like.

Examples of the dialcohols include ethylene glycol, 1,2-propanediol, 1,3-propanediol, 1,2-butanediol, 1,3-butanediol, 1,4-butanediol, 1,5-pentanediol, 1,2-pentanediol, 1,6-hexanediol, 1,7-heptanediol, 1,8-octanediol, 1,9-nonanediol, 2-ethyl-1,6-hexanediol, 2-methyl-1,3-propanediol, 3-methyl-1,5-pentanediol, neopentyl glycol, 1,3-cyclohexanediol, 1,4-cyclohexanediol, 1,4-dimethylolcyclohexane and the like. These dialcohols may be contained alone, or in combination of two or more.

Examples of the amines include (1) primary amines, (2) linear secondary amines, (3) branched secondary amines, (4) unsaturated double bond-containing secondary amines, (5) asymmetric secondary amines, (6) secondary amines having an aromatic substituent, and the like. These amines may be contained alone or in combination of two or more.

(1) Primary amines such as a methylamine, ethylamine, propylamine, butylamine, isobutylamine or the like.

(2) Linear secondary amines such as a dimethylamine, diethylamine, dipropylamine, dibutylamine, dipentylamine, dihexylamine, dioctylamine, dilaurylamine, ditridecylamine, distearylamine or the like.

(3) Branched secondary amines such as a diisopropylamine, diisobutylamine, di (2-butylamine), di (tert-butyl) amine, di (2-ethylhexyl) amine, dicyclohexylamine, di (2-methylcyclohexylamine) amine or the like.

(4) Unsaturated double bond-containing secondary amines such as a diallylamine or the like.

(5) Asymmetric secondary amines such as a methylethylamine, N-methylisopropylamine, methyl-tert-butylamine, N-methylhexylamine, ethyl-tert-butylamine, N-ethylhexylamine, N-ethyl-1,2-dimethylpropylamine, N-ethylisoamylamine, N-ethyllaurylamine, N-ethylstearylamine, N-methylcyclohexylamine, N-ethylcyclohexylamine, N-tert-butylcyclohexylamine, or the like.

(6) Secondary amines having an aromatic substituent such as a diphenylamine, dibenzylarnine, methylbenzylamine, ethylbenzylamine, tert-butylbenzylainine, N-methylaniline, N-ethylaniline, N-cyclohexylaniline, 3-(benzylamino) propionic acid ethyl ester or the like.

The blocked polyisocyanate component may contain one kind of the above-described compound having an active hydrogen-containing group, or may contain two or more kinds in combination.

Among the examples, for the compound having an active hydrogen-containing group, it is necessary to select the boiling point according to the temperature at which the coating film is baked and dried. The boiling point of the alcohols is preferably 200° C. or lower, more preferably 60° C. or higher and 160° C. or lower. When the boiling point of the alcohol is at least the above lower limit, it is possible to more effectively suppress the occurrence of problems such as popping when forming the coating film. When the boiling point of the alcohol is not more than the above upper limit, it is possible to more effectively suppress the difficulty in scattering the compound having an active hydrogen-containing group from the coating film.

Specific examples of the compound having an active hydrogen-containing group include n-butanol, isobutanol, tert-butanol, isoamyl alcohol and the like.

Although the molar content of the compound having an active hydrogen-containing group in the blocked polyisocyanate component can be arbitrarily selected, it is preferably 10 mol % or more and 1,000 mol % or less, more preferably 50 mol % or more and 950 mol % or less, and even more preferably 50 mol % or more and 800 mol % or less, with respect to the total molar amount of the blocked isocyanate groups in the blocked polyisocyanate component.

Examples of the solvent include hydrocarbons, ketones, esters and the like. Examples of the hydrocarbons include benzene, toluene, xylene, cyclohexane, mineral spirit, naphtha and the like. Examples of the ketones include acetone, methyl ethyl ketone, methyl isobutyl ketone and the like. Examples of the esters include ethyl acetate, n-butyl acetate, isobutyl acetate, cellosolve acetate, methoxypropyl acetate and the like. These solvents may be used alone or in combination of two or more.

(Method for Producing Blocked Polyisocyanate Component)

Generally, the blocked polyisocyanate component is not particularly limited, and for example, can be obtained by reacting the polyisocyanate with the blocking agent.

In addition, in the case where a hydrophilic compound is used, the blocked polyisocyanate component can be obtained, for example, by reacting the polyisocyanate, the hydrophilic compound and the blocking agent.

The reaction of the isocyanate group of the polyisocyanate with the hydrophilic compound and the reaction of the polyisocyanate with the blocking agent can be carried out at the same time, or it may also be that either of the reactions is carried out in advance, then the second reaction is carried out. Among the methods, it is preferable that the reaction between the isocyanate group and the hydrophilic compound is carried out in advance to obtain a polyisocyanate modified with the hydrophilic compound (hereinafter, may be referred to as "modified polyisocyanate"), and then the reaction between the obtained modified polyisocyanate and the blocking agent is carried out.

The reaction between the polyisocyanate and the hydrophilic compound may use an organometallic salt, a tertiary amine-based compound, or an alkali metal alcoholate as a catalyst. Examples of the metal constituting the organometallic salt include tin, zinc, lead and the like. Examples of the alkali metal include sodium and the like.

The reaction temperature of the polyisocyanate and the hydrophilic compound is preferably −20° C. or higher and 150° C. or lower, and more preferably 30° C. or higher and 100° C. or lower. When the reaction temperature is equal to or higher than the above lower limit, the reactivity tends to be improved. Further, when the reaction temperature is not more than the above upper limit, the side reaction tends to be suppressed more effectively.

It is preferable to completely react with polyisocyanate so that the hydrophilic compound does not remain in an unreacted state. By the unreacted hydrophilic compound not remaining, it tends to more effectively suppress the deterioration of the water dispersion stability of the blocked polyisocyanate component and the curability of the coating film.

The blocking reaction of the polyisocyanate or the modified polyisocyanate with the blocking agent can be carried out regardless of the presence or absence of a solvent to obtain a blocked polyisocyanate.

As the blocking agent, one selected from the blocking agents (3) may be used alone, or two or more selected from the group consisting of the blocking agents (3) and said other blocking agents described above may be used in combination.

The amount of the blocking agent added may usually be 80 mol % or more and 200 mol % or less, and preferably 100 mol % or more and 150 mol % or less, with respect to the total molar amount of the isocyanate groups. When the amount of the blocking agent added is in the above range, it is possible to more effectively suppress remaining of the unreacted and substantially active isocyanate groups.

The blocking reaction can generally be carried out at −20° C. or higher and 150° C. or lower, preferably 0° C. or higher and 100° C. or lower. When the temperature of the blocking reaction is at least the above lower limit, the reaction rate can be further increased, and when it is at least the above upper limit, the side reaction can be further suppressed.

After the blocking reaction, a neutralization treatment may be performed by adding an acidic compound or the like.

As the acidic compound, an inorganic acid may be used or an organic acid may be used. Examples of the inorganic acid include a hydrochloric acid, phosphite, phosphoric acid and the like. Examples of the organic acid include a methanesulfonic acid, p-toluenesulfonic acid, dioctylphthalate, dibutylphthalate and the like.

In the method for producing the blocked polyisocyanate component using a hydrophilic compound, even if the isocyanate group remains in the obtained modified polyisocyanate after the reaction between the polyisocyanate and the hydrophilic compound, the isocyanate group can be completely eliminated by adding the blocking agent.

[Polyol]

The polyol contained in the coating composition is also referred to as a multivalent hydroxy compound. Examples of the polyol include aliphatic hydrocarbon polyols, polyether polyols, polyester polyols, epoxy resins, fluorine-containing polyols, acrylic polyols and the like. Among the examples, the polyol is preferably a polyester polyol, fluorine-containing polyol or an acrylic polyol.

(Aliphatic Hydrocarbon Polyols)

Examples of the aliphatic hydrocarbon polyol include a terminal hydroxylated polybutadiene and hydrogenated product thereof, and the like.

(Polyether Polyols)

Examples of the polyether polyols include those obtained by any of the following methods (1) to (3).

(1) Polyether polyols or polytetramethylene glycols obtained by adding an alkylene oxide alone or a mixture thereof to a polyhydric alcohol alone or a mixture thereof.

(2) Polyether polyols obtained by reacting an allylene oxide with a polyfunctional compound.

(3) So-called polymer polyols obtained by polymerizing acrylamide or the like using the polyether polyols obtained in (1) or (2) as a medium.

Examples of the polyhydric alcohol include a glycerin, propylene glycol and the like.

Examples of the alkylene oxide include an ethylene oxide, propylene oxide and the like.

Examples of the polyfunctional compound include an ethylenediamine, ethanolanine and the like.

(Polyester Polyols)

Examples of the polyester polyols include the polyester polyols according to any one of (1) and (2) below.

(1) Polyester polyol resins obtained by condensation reaction of a dibasic acid alone or mixture of two or more thereof with a polyhydric alcohol alone or a mixture of two or more thereof.

(2) Polycaprolactones obtained by ring-opening polymerization of ε-caprolactone with a polyhydric alcohol.

Examples of the dibasic acid include carboxylic acids such as a succinic acid, adipic acid, dimer acid, maleic anhydride, phthalic acid anhydride, isophthalic acid, terephthalic acid, 1,4-cyclohexanedicarboxylic acid and the like.

Examples of the polyhydric alcohol include an ethylene glycol, propylene glycol, diethylene glycol, 1,4-butanediol, neopentyl glycol, 1,6-hexanediol, trimethylpentanediol, cyclohexanediol, trimethylolpropane, glycerin, pentaerythritol, 2-methylolpropanediol, ethoxylated trimethylpropane propane and the like.

(Epoxy Resins)

Examples of the epoxy resins include epoxy resins such as a novolak-type epoxy resin, β-methylepicro-type epoxy resin, cyclic oxylan-type epoxy resin, glycidyl ether-type epoxy resin, glycol ether-type epoxy resin, epoxy-type aliphatic unsaturated compound, epoxidized fatty acid ester, ester-type polyvalent carboxylic acid, aminoglycidyl-type epoxy resin, halogenated epoxy resin, resorcin-type epoxy resin or the like, resins obtained by modifying these epoxy resins with an amino compound, polyamide compound or the like, and the like.

(Fluorine-Containing Polyols)

Examples of the fluorine-containing polyols include copolymers of fluoroolefins, cyclohexyl vinyl ethers, hydroxyalkyl vinyl ethers, monocarboxylic acid vinyl esters and the like disclosed in Patent Documents 3 and 4.

(Acrylic Polyols)

The acrylic polyols can be obtained, for example, by polymerizing a polymerizable monomer having one or more active hydrogens in one molecule, or obtained by copolymerizing a polymerizable monomer having one or more active hydrogens in one molecule and, if necessary, another monomer copolymerizable with the polymerizable monomer.

Examples of the polymerizable monomer having one or more active hydrogens in one molecule include those shown in (i) to (iii) below. These may be used alone or in combination of two or more.

(i) Acrylic acid esters having an active hydrogen such as a 2-hydroxyethyl acrylate, 2-hydroxypropyl acrylate, 2-hydroxybutyl acrylate or the like.

(ii) Methacrylic acid esters having an active hydrogen such as a 2-hydroxyethyl methacrylate, 2-hydroxypropyl methacrylate, 2-hydroxybutyl methacrylate or the like.

(iii) (meth) acrylic acid esters having a polyvalent active hydrogen such as an acrylic acid monoester or methacrylic acid monoester of glycerin, acrylic acid monoester or methacrylic acid monoester of trimethylpropan or the like.

Examples of other monomers copolymerizable with the polymerizable monomer include those shown in (i) to (v) below. These may be used alone or in combination of two or more.

(i) Acrylic acid esters such as a methyl acrylate, ethyl acrylate, isopropyl acrylate, n-butyl acrylate, and 2-ethylhexyl acrylate or the like.

(ii) Methacrylic acid esters such as a methyl methacrylate, ethyl methacrylate, isopropyl methacrylate, n-butyl methacrylate, isobutyl methacrylate, n-hexyl methacrylate, cyclohexyl methacrylate, lauryl methacrylate, glycidyl methacrylate or the like.

(iii) Unsaturated carboxylic acids such as an acrylic acid, methacrylic acid, maleic acid, itaconic acid or the like.

(iv) Unsaturated amides such as an acrylamide, N-methylolacrylamide, diacetoneacrylamide or the like.

(v) Styrene, vinyltoluene, vinyl acetate, acrylonitrile and the like.

In addition, acrylic polyols obtained by copolymerizing the polymerizable ultraviolet stable monomer disclosed in Patent Documents 5 and 6 and the like may also be mentioned.

Specific examples of the polymerizable ultraviolet stable monomer include a 4-(meth) acryloyloxy-2,2,6,6-tetramethylpiperidin, 4-(meth) acryloylamino-2,2,6,6-tetramethylpiperidin, 1-crotonoyl-4-crotonoyloxy-2,2,6,6-tetramethylpiperidine, 2-hydroxy-4-(3-methacryloxy-2-hydroxypropoxy) benzophenone and the like.

(Hydroxyl Value of Polyol)

The hydroxyl value of the polyol is preferably 10 mg KOH/g or more and 300 mg KOH/g or less.

When the hydroxyl group of the polyol is at least the above lower limit, the crosslink density of urethane due to the reaction with polyisocyanate is further increased, and the function of urethane bonding is more easily exhibited. On the other hand, when the hydroxyl group of the polyol is not more than the above upper limit, the crosslink density does not increase too much, and the mechanical properties of the coating film improves.

[Other Components]

The coating composition may contain other components in addition to the blocked polyisocyanate component and the polyol.

Examples of said other components include curing agents that can react with crosslinkable functional groups in polyols, curing catalysts, solvents, pigments (constitution pigments, coloring pigments, metallic pigments, etc.), ultraviolet absorbers, light stabilizers, radical stabilizers, anti-yellowing agents that suppress coloration during the baking process, coating surface-adjusting agents, flow-adjusting agents, pigment dispersants, defoaming agents, thickeners, and film-forming aids and the like.

Examples of the curing agent include a melamine resin, urea resin, epoxy group-containing compound or resin, carboxyl group-containing compound or resin, acid anhydride, alkoxysilane group-containing compound or resin, hydrazide compound and the like.

The curing catalyst may be a basic compound or a Lewis acidic compound.

Examples of the basic compound include a metal hydroxide, metal alkoxide, metal carboxylate, metal acetyl acetonate, hydroxide of onium salt, onium carboxylate, halide of onium salt, metal salt of active methylene compound, onium salt of active methylene compound, aminosilanes, amines, phosphines and the like. As the onium salt, an ammonium salt, a phosphonium salt or a sulfonium salt is suitable.

Examples of the Lewis acidic compound include an organic tin compound, organic zinc compound, organic titanium compound, organic zirconium compound and the like.

Examples of the solvent include those exemplified in the above-mentioned blocked isocyanate composition.

[Method for Producing Coating Composition]

The coating composition can be used for both a solvent-based and water-based coating composition.

In the case of producing an aqueous coating composition, first, additives such as a curing agent capable of reacting with a crosslinkable functional group, a curing catalyst, solvent, pigments (constitution pigments, coloring pigments, metallic pigments, etc.), ultraviolet absorber, light stabilizer, radical stabilizer, anti-yellowing agent that suppress coloring during the baking process, coating surface-adjusting agent, flow-adjusting agent, pigment dispersant, defoaming agent, thickener, film-forming aid or the like are added to the polyol, or water dispersion or water solution thereof, if necessary. Next, the above-mentioned blocked isocyanate component or water dispersion thereof is added as a curing agent, and if necessary, water or a solvent is further added to adjust the viscosity. Then, by forcibly stirring with a stirring device, an aqueous coating composition can be obtained.

In the case of producing a solvent-based coating composition, first, additives such as a curing agent capable of reacting with a crosslinkable functional group, a curing catalyst, solvent, pigments (constitution pigments, coloring pigments, metallic pigments, etc.), ultraviolet absorber, light stabilizer, radical stabilizer, anti-yellowing agent that suppress coloring during the baking process, coating surface-adjusting agent, flow-adjusting agent, pigment dispersant, defoaming agent, thickener, film-forming aid or the like are added to the polyol or solvent-diluted product thereof, if necessary. Next, the above-mentioned blocked isocyanate component is added as a curing agent, and if necessary, water or a solvent is further added to adjust the viscosity. Then, by stirring manually or stirring with a stirring device such as Mazelar or the like, a solvent-based coating composition can be obtained.

<Method for Producing Coating Film>

The coating film of the present embodiment can be obtained by applying the coating composition to an object to be coated, drying and curing the coating film. The coating method of the coating composition is not particularly limited, and examples thereof include known coating methods such as roll coating, curtain flow coating, spray coating, bell coating, electrostatic coating and the like.

The drying temperature may be, for example, 100° C. or higher and 200° C. or lower, or may be 110° C. or higher and 180° C. or lower, or may be 120° C. or higher and 160° C. or lower. In this case, the drying time may be, for example, 10 minutes or more and 60 minutes or less, or may be 20 minutes or more and 40 minutes or less.

Further, the drying temperature may be, for example, 70 to 90° C., or 80 to 90° C. In this case, the drying time may be, for example, 1 to 14 days or 2 to 7 days.

Examples of the object to be coated include outer panels of an automobile body such as passenger cars, trucks, motorcycles, buses or the like; automobile parts such as bumpers or the like; outer panels of home appliances such as mobile phones, audio devices or the like, and among them, outer panels of an automobile body or automobile parts are preferable.

The material of the substrate is not particularly limited, and examples thereof include metallic materials such as iron, aluminum, brass, copper, tin, stainless steel, zinc-plated steel, zinc alloy (Zn—Al, Zn—Ni, Zn—Fe, etc.)-plated steel; resins such as a polyethylene resin, polypropylene resin, acrylonitrile-butadiene-styrene (ABS) resin, polyamide resin, acrylic resin, vinylidene chloride resin, polycarbonate resin, polyurethane resin, epoxy resin or the like, various plastic materials such as FRP; inorganic materials such as glass, cement and concrete or the like; wood; fiber materials such as paper, cloth or the like. Among the examples, metal materials or plastic materials are preferable.

The substrate may be one in which a surface of the above-described metal material or a metal surface of a vehicle body or the like molded from the above-described metal material is subjected to a surface treatment such as phosphate treatment, chromate treatment, or composite oxide treatment, and may also be one in which a coating film is further formed thereon.

The substrate on which a coating film is formed may be one in which a surface treatment is applied as necessary and an undercoat coating film is formed thereon, for example, a vehicle body in which an undercoat coating film is formed by an electrodeposition paint.

The substrate may be one in which a surface of the above-described plastic material or a plastic surface of an automobile part or the like molded from the above-described metal material is subjected to a surface treatment as needed.

Further, the substrate may be a combination of a plastic material and a metal material.

The coating film of the present embodiment is suitably used for outer panels of automobile bodies, automobile parts and the like.

EXAMPLES

Hereinafter, the present embodiment will be described in more detail based on Examples and Comparative Examples, but the present embodiment is not limited to the following Examples.

"Parts" in Examples and Comparative Examples are based on mass.

<Measurement and Evaluation Method of Physical Property>

[Physical Property 1] Isocyanate Group Content of Polyisocyanate (Mass %)

1 to 3 g of polyisocyanate was precisely weighed in an Erlenmeyer flask (Wg). Then, 20 mL of toluene was added to the Erlenmeyer flask to dissolve the polyisocyanate. Then, 10 mL of a 2N toluene solution of di-n-butylamine was added, and after mixing, the mixture was left at room temperature for 15 minutes. Then, 70 mL of isopropyl alcohol was added to the Erlenmeyer flask and mixed. This solution was titrated with a 1N hydrochloric acid solution (Factor F) as an indicator. This titration value was defined as V2 mL, then, the same operation was performed without polyisocyanate, and the titration value was set to V1 mL. Next, the NCO content of the polyisocyanate was calculated by the formula shown below.

$$\text{NCO content(mass \%)} = (V1-V2) \times F \times 42/(Wg \times 1000) \times 100$$

[Physical Property 2] Effective NCO Content (Mass %)

The effective NCO content of the blocked polyisocyanate composition was determined as follows. Here, the term "effective NCO content (mass %)" is a quantification of the amount of blocked isocyanate groups present in the blocked polyisocyanate component after the blocking reaction and involved in the crosslinking reaction, and is expressed as mass % of isocyanate groups. The effective NCO content was calculated by the formula shown below. In the formula shown below, "S" represents the non-volatile content (mass %) of the blocked polyisocyanate component. "W1" represents the mass (g) of the polyisocyanate used in the reaction. "A" represents the isocyanate group content (mass %) of the polyisocyanate. "W2" represents the mass (g) of the blocked polyisocyanate after the blocking reaction.

$$\text{Effective NCO content(mass \%)} = \{S \times (W1 \times A)\}/W2$$

When the sample was diluted with a solvent or the like, the value in the diluted state is described.

[Physical Property 3] Non-Volatile Content (Mass %)

The non-volatile content of the blocked polyisocyanate component was determined as follows. First, an aluminum dish having a bottom diameter of 38 mm was precisely weighed, and then about 1 g of each blocked polyisocyanate component was placed on the aluminum dish and weighed (W1). Then, the blocked polyisocyanate component was adjusted to a uniform thickness and then kept in an oven at 105° C. for 1 hour. After the aluminum dish reached room temperature, the blocked polyisocyanate component remaining on the aluminum dish was precisely weighed (W2). Next, the non-volatile content of the blocked polyisocyanate component was calculated by the formula shown below.

$$\text{Non-volatile content(mass \%)} = W2/W1 \times 100$$

[Physical Property 4] Hardness of Coating Film (König Hardness)

For each coating film, the König hardness was measured using a König hardness tester (manufactured by BYK Garden, trade name "Pendulum hardness tester").

[Physical Property 5] Tensile Test

A short strip-shaped test piece (width 10 mm×length 100 mm) was cut out from each coating film. Next, using the test piece, a tensile test was carried out in a tensile tester (TCM 500 type) at a tensile speed of 10 mm/sec and a chuck distance of 50 mm in an environment of 23° C./50% RH, and the yield point was determined. The presence or absence of the yield point and the yield point stress (if there was no clear yield point, it was replaced with the inflection point stress (MPa) of the elastic deformation region and the plastic deformation region) were measured.

[Evaluation 1] Pot Life of Coating Composition

Each coating composition was sealed in a glass container in a nitrogen atmosphere and stored in an environment of 40° C. The pot life of the coating composition was evaluated according to the following evaluation criteria based on the number of days until gelation.

(Evaluation Criteria)
○: 10 days or more
Δ: 5 days or more and 9 days or less
x: 4 days or less

[Evaluation 2] Curability (Gel Fraction)

Each coating film was peeled off from the polypropylene plate, and its mass was measured. This coating film was immersed in acetone at 23° C. for 24 hours. After the immersion, the undissolved coating film was dried at 105° C. for 60 minutes, and then its mass was measured. The ratio of the mass after immersion to the mass before immersion (gel fraction: %) was calculated, and the curability was evaluated according to the following evaluation criteria.

(Evaluation Criteria)
◎: Gel fraction was 90% or more
○: Gel fraction was 85% or more and less than 90%
Δ: Gel fraction was 80% or more and less than 85%
x: Gel fraction was less than 80%

[Evaluation 3] Solvent Resistance

A cotton ball having a diameter of 10 mm containing 1 g of xylene was placed on each coating film for 5 minutes, and the state of the coating film after removing xylene remaining on the surface was observed. The solvent resistance was evaluated according to the following evaluation criteria.

(Evaluation Criteria)
○: Transparent and no recess was formed
Δ: Slightly cloudy or slightly recessed
x: Cloudy or recessed

[Evaluation 4] Appearance

The appearance of each coating film was visually observed to confirm the presence or absence of abnormalities. The appearance was evaluated according to the following evaluation criteria.

(Evaluation Criteria)
○: No roughness or abnormality was observed on the coating film surface.
x: Roughness or abnormality was observed on the coating film surface.

[Evaluation 5] Adhesion to Plastic Film

A cross-cut test was carried out by cutting a PET film having each of the coating films into 100 grids at 1 mm intervals.

(Evaluation Criteria)
◎: No grids were peeled and no defects such as chipping were occurred on the grids.
○: No grids were peeled, but defects such as chipping were occurred on the grids.
x: One or more grids were peeled.

[Evaluation 6] Dimensional Stability of Plastic Film

PET films having each of the coating films were cut out at a size of 10 cm×10 cm, and heat-treated at 200° C. for 20 minutes, and then the dimensions of the film before and after the heat treatment were compared and evaluated according to the following evaluation criteria.

(Evaluation Criteria)
◎: Film dimensional change rate was less than 1%.
○: Film dimensional change rate was 1% or more and less than 2%.
Δ: Film dimensional change rate was 2% or more and less than 3%.
x: Film dimensional change rate was 3% or more.

<Preparation of Polyisocyanate and Blocked Polyisocyanate Components>

[Synthesis Example 1] Synthesis of Isocyanurate-Type Polyisocyanate P-1

1,000 parts of HDI was placed in a four-necked flask equipped with a thermometer, stirring blade and reflux condenser, and the temperature inside the reactor was maintained at 70° C. while stirring. Then, tetramethylammonium capriate was added thereto, and when the yield reached 40%, phosphoric acid was added and the reaction was stopped. After filtering the reaction solution, unreacted HDI was removed by a thin film distillation apparatus to obtain isocyanurate-type polyisocyanate P-1.

The NCO content of the obtained isocyanurate-type polyisocyanate P-1 was 21.8 mass %.

[Synthesis Example 2] Synthesis of Blocked Polyisocyanate Component BP-1

In a four-necked flask equipped with a thermometer, stirring blade and reflux condenser, under a nitrogen stream, 100 parts of P-1, 113 parts of di-tert-butyl malate (100 mol % with respect to isocyanate (NCO)groups), 61 parts of butyl acetate, and 0.8 parts of a methanol solution containing 28 mass % of sodium methylate with respect to the total mass of the solution (0.224 parts of sodium methylate) were added at room temperature, and reacted at 60° C. for 3 hours. Then, 80 parts of isobutanol was added and further reacted at 60° C. for 2 hours to obtain a blocked polyisocyanate component BP-1. The obtained blocked polyisocyanate component BP-1 had an effective NCO group content of 6.1% and a non-volatile content of 60%.

[Synthesis Example 3] Synthesis of Blocked Polyisocyanate Component BP-2

In a four-necked flask equipped with a thermometer, stirring blade and reflux condenser, under a nitrogen stream, 100 parts of P-1, 98 parts of di-iso-propyl malate (100 mol % with respect to isocyanate (NCO)groups), 51 parts of butyl acetate, and 0.8 parts of a methanol solution containing 28 mass % of sodium methylate with respect to the total mass of the solution (0.224 parts of sodium methylate) were added at room temperature, and reacted at 60° C. for 3 hours. Then, 80 parts of isobutanol was added and further reacted at 60° C. for 2 hours to obtain a blocked polyisocyanate component BP-2. The obtained blocked polyisocyanate component BP-2 had an effective NCO group content of 6.6% and a non-volatile content of 60%.

[Synthesis Example 4] Synthesis of Blocked Polyisocyanate Component BP-3

In a four-necked flask equipped with a thermometer, stirring blade and reflux condenser, under a nitrogen stream, 100 parts of P-1, 9 parts of di-iso-propyl malate, 76 part of diethyl malate (100 mol % with respect to isocyanate (NCO) groups), 42 parts of butyl acetate, and 0.8 parts of a methanol solution containing 28 mass % of sodium methylate with respect to the total mass of the solution (0.224 parts of sodium methylate) were added at room temperature, and reacted at 60° C. for 3 hours. Then, 80 parts of isobutanol was added and further reacted at 60° C. for 2 hours to obtain a blocked polyisocyanate component BP-3. The obtained blocked polyisocyanate component BP-3 had an effective NCO group content of 7.1% and a non-volatile content of 60%.

[Synthesis Example 5] Synthesis of Blocked Polyisocyanate Component BP-4

In a four-necked flask equipped with a thermometer, stirring blade and reflux condenser, 100 parts of P-1 was charged under a nitrogen stream, and then 50 parts of 3,5-dimethylpyrazole (100 mol % with respect to isocyanate (NCO) groups) was added thereto, and the mixture was reacted at 80° C. for 1 hour. Then, after confirming that the NCO groups had disappeared, 64 parts of dipropylene glycol monomethyl ether was added, and stirring was continued for another 1 hour to obtain a blocked polyisocyanate component BP-4. The obtained blocked polyisocyanate component BP-4 had an effective NCO group content of 10.1% and a non-volatile content of 70%.

<Preparation of Coating Film>

[Example 1] Preparation of Coating Film (1) Preparation of Coating Composition T-1a
The blocked polyisocyanate component BP-1 prepared in Synthesis Example 2 and the main agents were mixed according to the composition shown below to obtain a coating composition T-1a. The effective NCO/OH ratio was 0.5.
(Composition of Coating Material)
Blocked polyisocyanate component BP-1
Setalux 1767 (Acrylic polyol, manufactured by Nuplex Resins)
Mixing ratio: effective NCO/OH=0.5
Diluting solvent: butyl acetate
Solid content of coating material: 50%
(2) Preparation of Coating Film 1
The coating films used for Physical property 4 and Evaluations 3 and 4 were prepared by the method shown below. Specifically, the coating composition T-1a was applied on a glass plate so that the thickness of the coating film after drying was 50 μm. The coating film was then allowed to stand in an environment of 23° C./50% RH for 10 minutes and then dried at 140° C. for 30 minutes. After drying, the coating film was allowed to stand in an environment of 23° C./50% RH for 1 day to obtain a dried coating film. Using the obtained coating film, various physical properties were measured and evaluated by the methods described in Physical property 4 and Evaluations 3 and 4. The results are shown in Table 1.
(3) Preparation 2 of Coating Film
The coating film used for Physical property 5 and Evaluation 2 was prepared by the method shown below. Specifically, the coating composition T-1a was coated on a polypropylene plate with an applicator so that the thickness of the resin film after drying was 50 μm, and then set at room temperature for 10 minutes. Then, the coating film was baked at 140° C. for 30 minutes to obtain a cured coating film. Using the obtained coating film, evaluation was carried out according to the methods described in Physical property 5 and Evaluation 2. The results are shown in Table 1.

[Examples 2 to 9 and Comparative Examples 1 to 7] Preparation of Coating Film (1) Coating Compositions T-2a to T-9a and T-1b to T-7b
The coating compositions were obtained by mixing the components according to the same composition as in (1) of Example 1, except that the types of the blocked polyisocyanate components and the effective NCO/OH ratios were as shown in Table 1 or 3.
(2) Preparation 1 of Coating Film
The coating film was prepared by the same method as in (2) of Example 1 using the coating compositions. The physical properties were measured and evaluated by the methods described in Physical property 4 and Evaluations 3 and 4 using the obtained coating film. The results are shown in Tables 1 and 2.
(3) Preparation 2 of Coating Film
The coating film was prepared by the same method as in (3) of Example 1 using the coating compositions. The physical properties were measured and evaluated by the methods described in Physical property 5 and Evaluation 2 using the obtained coating file. The results are shown in Tables 1 and 2.

[Examples 10 to 15] Preparation of Coating Film (1) Coating Composition
The coating compositions were obtained by mixing the components according to the same composition as in (1) of Example 1, except that the types of the blocked polyisocyanate components and the effective NCO/OH ratios were as shown in Table 2.
(2) Preparation 1 of Coating Film
The coating films used for Physical property 4 and Evaluations 3 and 4 were prepared by the method shown below. Specifically, the coating compositions shown in Table 2 were applied on a glass plate so that the thickness of the coating film after drying was 50 μm. The coating films were then allowed to stand in an environment of 23° C./50% RH for 10 minutes and then dried and aged at 80° C. for 7 days. After drying, the coating films were allowed to stand in an environment of 23° C./50% RH for 1 day to obtain dried coating films. Using the obtained coating films, various physical properties were measured and evaluated by the methods described in Physical property 4 and Evaluations 3 and 4. The results are shown in Table 2.
(3) Preparation 2 of Coating Film
The coating film used for Physical property 5 and Evaluation 2 was prepared by the method shown below. Specifically, the coating compositions shown in Table 2 were coated on a polypropylene plate with an applicator so that the thickness of the resin film after drying was 50 μm, and then set at room temperature for 10 minutes. Then, the coating films were dried and cured 80° C. for 7 days to obtain cured coating films. Using the obtained coating films, evaluation was carried out according to the methods described in Physical property 5 and Evaluation 2. The results are shown in Table 2.

In Tables 1 to 3, the abbreviations of the blocking agents indicate the following compounds, respectively.
MA-tBu: di-tert-butyl malonate
MA-iPr: di-iso-propyl malonate
MA-Et: diethyl malonate
Py: 3,5-dimethylpyrazole

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Coating composition | T-1a | T-2a | T-3a | T-4a | T-5a | T-6a | T-7a | T-8a | T-9a |
| Blocked polyisocyanate component | BP-1 | BP-1 | BP-1 | BP-1 | BP-2 | BP-2 | BP-3 | BP-3 | BP-4 |
| Blocking agent | MA-tBu | MA-tBu | MA-tBu | MA-tBu | MA-iPr | MA-iPr | MA-Et MA-iPr | MA-Et MA-iPr | MA-Et |
| [Physical property 2] Effective NCO (%) | 6.1 | 6.1 | 6.1 | 6.1 | 6.6 | 6.6 | 7.1 | 7.1 | 7.6 |
| [Physical property 3] Non-volatile content (solid content) (%) | 60 | 60 | 60 | 60 | 60 | 60 | 60 | 60 | 60 |
| NCO/OH | 0.5 | 0.7 | 1.0 | 2.0 | 0.7 | 1.0 | 0.7 | 1.0 | 1.0 |
| [Evaluation 1] Pot life of coating composition | ○ | Δ | Δ | Δ | ○ | ○ | ○ | ○ | ○ |
| Coating film drying condition (° C./min) | 140/30 | 140/30 | 140/30 | 140/30 | 140/30 | 140/30 | 140/30 | 140/30 | 140/30 |
| [Physical property 4] König hardness (sec) | 84 | 96 | 47 | 22 | 78 | 47 | 57 | 47 | 45 |
| [Physical property 5] Stress at inflection point (Mpa) | 24 | 26 | 22 | 15 | 18 | 15 | 8 | 6 | 6 |
| [Evaluation 2] Curability (gel fraction) | ◎ | ◎ | ◎ | ○ | ◎ | ◎ | ◎ | ◎ | ◎ |
| [Evaluation 3] Solvent resistance | ○ | ○ | ○ | ○ | ○ | ○ | Δ | Δ | Δ |
| [Evaluation 4] Appearance (smoothness) | ○ | ○ | ○ | ○ | ○ | ○ | ○ | ○ | ○ |
| [Evaluation 5] Adhesion to plastic substrate | ○ | ○ | ○ | ◎ | ○ | ◎ | ◎ | ◎ | ◎ |
| [Evaluation 6] Dimensional stability of plastic film | ○ | ◎ | ◎ | Δ | ○ | ○ | Δ | Δ | Δ |

TABLE 2

|  | Ex. 10 | Ex. 11 | Ex. 12 | Ex. 13 | Ex. 14 | Ex. 15 |
|---|---|---|---|---|---|---|
| Coating composition | T-1a | T-3a | T-5a | T-6a | T-8a | T-9a |
| Blocked polyisocyanate component | BP-1 | BP-1 | BP-2 | BP-2 | BP-3 | BP-4 |
| Blocking agent | MA-tBu | MA-tBu | MA-iPr | MA-iPr | MA-Et MA-iPr | MA-Et |
| [Physical property 2] Effective NCO (%) | 6.1 | 6.1 | 6.6 | 6.6 | 7.1 | 7.6 |
| [Physical property 3] Non-volatile content (solid content) (%) | 60 | 60 | 60 | 60 | 60 | 60 |
| NCO/OH | 0.5 | 1.0 | 0.7 | 1.0 | 1.0 | 1.0 |
| [Evaluation 1] Pot life of coating composition | ○ | Δ | ○ | ○ | ○ | ○ |
| Coating film drying condition (° C./min) | 80/7 | 80/7 | 80/7 | 80/7 | 80/7 | 80/7 |
| [Physical property 4] König hardness (sec) | 86 | 50 | 80 | 48 | 40 | 35 |
| [Physical property 5] Stress at inflection point (Mpa) | 25 | 24 | 19 | 16 | 5 | 5 |
| [Evaluation 2] Curability (gel fraction) | ◎ | ◎ | ◎ | ◎ | ○ | Δ |
| [Evaluation 3] Solvent resistance | ○ | ○ | ○ | ○ | Δ | Δ |
| [Evaluation 4] Appearance (smoothness) | ○ | ○ | ○ | ○ | ○ | ○ |
| [Evaluation 5] Adhesion to plastic substrate | ○ | ○ | ○ | ◎ | ◎ | ◎ |
| [Evaluation 6] Dimensional stability of plastic film | ○ | ◎ | ○ | ○ | Δ | Δ |

TABLE 3

|  | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|
| Coating composition | T-1b | T-2b | T-3b | T-4b | T-5b | T-6b | T-7b |
| Blocked polyisocyanate component | BP-1 | BP-1 | BP-1 | BP-1 | BP-3 | BP-3 | BP-4 |
| Blocking agent | MA-tBu | MA-tBu | MA-tBu | MA-tBu | MA-Et MA-iPr | MA-Et MA-iPr | Py |
| [Physical property 2] Effective NCO (%) | 6.1 | 6.1 | 6.1 | 6.1 | 7.1 | 7.1 | 10.1 |
| [Physical property 3] Non-volatile content (solid content) (%) | 60 | 60 | 60 | 60 | 60 | 60 | 70 |
| NCO/OH | 0.2 | 2.2 | 0.7 | 1.0 | 0.7 | 1.2 | 1.0 |
| [Evaluation 1] Pot life of coating composition | ○ | X | Δ | Δ | ○ | ○ | ○ |
| Coating film drying condition (° C./min) | 140/30 | 140/30 | 90/30 | 90/30 | 90/30 | 90/30 | 140/30 |
| [Physical property 4] König hardness (sec) | 17 | 18 | 16 | 19 | 3 | 2 | 105 |
| [Physical property 5] Stress at inflection point (Mpa) | 17 | 12 | 13 | 16 | — | — | 30 |
| [Evaluation 2] Curability (gel fraction) | Δ | Δ | ○ | ○ | ○ | ○ | ○ |
| [Evaluation 3] Solvent resistance | X | Δ | X | X | X | X | ○ |
| [Evaluation 4] Appearance (smoothness) | ○ | ○ | ○ | ○ | ○ | ○ | X |

TABLE 3-continued

| | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|
| [Evaluation 5] Adhesion to plastic substrate | ◎ | ◎ | ◎ | ◎ | ◎ | ◎ | X |
| [Evaluation 6] Dimensional stability of plastic film | X | X | X | X | X | X | ○ |

As shown in Tables 1 and 2, the coating films (Examples 1 to 15) having the structure (1) derived from an active methylene-based blocking agent, having a König hardness of 20 or more, and having an elastic deformation region and a plastic deformation region demonstrated good solvent resistance and dimensional stability of plastic film.

In the coating films (Examples 1 to 4, 10, 11) using the coating compositions having different effective NCO/OH ratios, the coating films having an effective NCO/OH ratio of 1.0 or less (Examples 1 to 3, 10, 11) demonstrated particularly good curability of coating film and dimensional stability of plastic film compared to the coating film having an effective NCO/OH ratio of 2.0 (Example 4).

The coating films using a di-tert-butyl malonate or a di-iso-propyl malonate alone as a blocking agent (Examples 3, 6, 11, 13) demonstrated particularly good solvent resistance of coating film and dimensional stability of plastic film compared to the coating films using a di-tert-butyl malonate and a diethyl malonate in combination (Examples 8 and 14) and the coating films using a diethyl malonate alone (Examples 9 and 15).

On the other hand, as shown in Table 3, although the coating films having a König hardness of less than 20 (Comparative Examples 1 to 6) demonstrated good curability, appearance and adhesion to plastic film, the solvent resistance and the plastic film were.

Further, in the coating film using a pyrazole-based blocking agent (Comparative Example 7), although the curability, solvent resistance and dimensional stability of plastic film were good, the appearance and adhesion to a plastic substrate were inferior, since dissociated blocking agent component remained in the coating film.

INDUSTRIAL APPLICABILITY

According to the coating film of the present embodiment, a coating film formed by curing a one-liquid type coating composition can be provided. The coating film has excellent solvent resistance while maintaining good appearance, and has good dimensional stability of plastic film when laminated with the coating film.

The invention claimed is:

1. A coating film having a structure represented by the following general formula (1), wherein
a König hardness of the coating film is 20 or more,
in an SS curve measurement of a tensile test, the coating film has an elastic deformation region and a plastic deformation region,
in the SS curve measurement, a stress at an inflection point stress between the elastic deformation region and the plastic deformation region is 5 MPa or more,
the coating film is formed by curing a coating composition containing a blocked polyisocyanate component and a polyol,
in the coating composition, a molar ratio of the isocyanate group of the blocked polyisocyanate component to a hydroxyl group of the polyol is 0.4 or more and 2.0 or less, and
the blocked polyisocyanate component contains a blocked polyisocyanate obtained from a polyisocyanate and a compound represented by the following general formula (3),

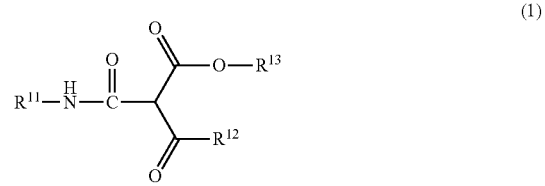

(1)

wherein, in (the general formula (1), $R^{11}$ is a residue formed by removing one isocyanate group from any one of isocyanurate-type polyisocyanates, biuret-type polyisocyanates, urethane-modified isocyanurate-type polyisocyanates, and allophanate-type polyisocyanates, $R^{12}$ is a secondary alkoxy group or a tertiary alkoxy group having 2 to 12 carbon atoms, $R^{13}$ is an alkyl group,

(3)

wherein, in the general formula (3), $R^{31}$ is an alkyl group, and $R^{32}$ is a secondary alkoxy group or a tertiary alkoxy group having 2 to 12 carbon atoms.

2. The coating film according to claim 1, wherein the stress at an inflection point is 20 MPa or more.

3. The coating film according to claim 1, wherein the molar ratio of the isocyanate group of the polyisocyanate component to the hydroxyl group of the polyol is 0.4 or more 1.0 or less.

4. The coating film according claim 1, wherein $R^{31}$ is a secondary alkyl group or a tertiary alkyl group.

5. The coating film according to claim 1, wherein $R^{31}$ is a tertiary alkyl group.

6. The coating film according to claim 1, wherein $R^{32}$ is a tertiary alkoxy group having 2 to 12 carbon atoms.

7. A method for producing a coating film, comprising:
applying a coating composition containing a blocked polyisocyanate component and a polyol and drying at 100 to 200° C. for 10 to 60 minutes or at 70 to 90° C. for 1 to 14 days, wherein
in the coating composition, a molar ratio of the isocyanate group of the blocked polyisocyanate component to a hydroxyl group of the polyol is 0.4 or more and 2.0 or less, and the blocked polyisocyanate component contains a blocked polyisocyanate obtained from a polyisocyanate and a compound represented by the following general formula (3),

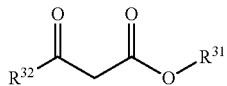
(3)

wherein, in (the general formula (3), $R^{31}$ is an alkyl group, and $R^{32}$ is a secondary alkoxy group or a tertiary alkoxy group.

8. The method for producing a coating film according to claim 7, wherein the molar ratio of the isocyanate group of the blocked polyisocyanate component to the hydroxyl group of the polyol is 0.4 or more and 1.0 or less.

9. The method for producing a coating film according to claim 7, wherein $R^{32}$ has 2 to 12 carbon atoms.

* * * * *

UNITED STATES PATENT AND TRADEMARK OFFICE
CERTIFICATE OF CORRECTION

PATENT NO. : 11,629,218 B2
APPLICATION NO. : 17/273534
DATED : April 18, 2023
INVENTOR(S) : E. Tanaka et al.

It is certified that error appears in the above-identified patent and that said Letters Patent is hereby corrected as shown below:

In the Claims

Column 28, Lines 51-52 (Claim 3, Lines 3-4) please change "more 1.0" to -- more and 1.0 --
Column 28, Line 53 (Claim 4, Line 1) please change "according claim" to -- according to claim --

Signed and Sealed this
Twelfth Day of September, 2023

Katherine Kelly Vidal
*Director of the United States Patent and Trademark Office*